(12) United States Patent
Jewell et al.

(10) Patent No.: US 10,873,243 B2
(45) Date of Patent: Dec. 22, 2020

(54) ELECTRICAL MACHINE

(71) Applicant: ROLLS-ROYCE plc, London (GB)

(72) Inventors: Geraint W. Jewell, Sheffield (GB);
Adam J. McLoughlin, Derby (GB);
Ellis F H Chong, Derby (GB)

(73) Assignee: ROLLS-ROYCE PLC, London (GB)

( * ) Notice: Subject to any disclaimer, the term of this patent is extended or adjusted under 35 U.S.C. 154(b) by 486 days.

(21) Appl. No.: 15/795,492

(22) Filed: Oct. 27, 2017

(65) Prior Publication Data

US 2018/0131250 A1    May 10, 2018

(30) Foreign Application Priority Data

Nov. 4, 2016 (GB) .................................. 1618616.5

(51) Int. Cl.
H02K 7/108 (2006.01)
H02K 7/12 (2006.01)
(Continued)

(52) U.S. Cl.
CPC ........... *H02K 7/1085* (2013.01); *F16D 11/14* (2013.01); *F16D 27/01* (2013.01); *F16D 27/108* (2013.01);
(Continued)

(58) Field of Classification Search
CPC . H02K 7/108; H02K 1/27; H02K 7/10; F16D 11/14; F16D 27/01; F16D 27/108; F16D 27/118

See application file for complete search history.

(56) References Cited

U.S. PATENT DOCUMENTS 1,953,179 A    4/1934 Kingston
3,626,220 A  * 12/1971 Niculescu .............. H02K 7/125
                                                        310/77

(Continued)

FOREIGN PATENT DOCUMENTS

CN    101577463    11/2009
CN    104836372     8/2015
(Continued)

OTHER PUBLICATIONS

Great Britain Search Report dated May 15, 2017, issued in GB Patent Application No. 1618616.5.
(Continued)

*Primary Examiner* — Tran N Nguyen
*Assistant Examiner* — Leda T Pham
(74) *Attorney, Agent, or Firm* — Brinks Gilson & Lione

(57) ABSTRACT

An electrical machine comprising a two-part rotor formed of a first rotor part and a second rotor part. The first rotor part includes a conical section and is mounted to a shaft of the machine. The second rotor part has a bore including a complementary conical section. The second rotor part is configured to displace axially between a first state, in which it is engaged with the first rotor part to form the rotor of the electrical machine, and a second state, in which it is axially disengaged from the first rotor part. Also a clutch having an engaged state and a disengaged state. When the clutch is in one of its states the second rotor part is in its first state and switching the clutch to the other of its states axially displaces the second rotor part to its second state.

15 Claims, 12 Drawing Sheets

(51) Int. Cl.
    *H02K 7/18* (2006.01)
    *F16D 11/14* (2006.01)
    *F16D 27/01* (2006.01)
    *F16D 27/108* (2006.01)
    *F16D 27/118* (2006.01)
    *H02K 1/27* (2006.01)
    *F02C 7/36* (2006.01)

(52) U.S. Cl.
    CPC ........... *F16D 27/118* (2013.01); *H02K 1/272* (2013.01); *H02K 7/125* (2013.01); *H02K 7/1823* (2013.01); *F02C 7/36* (2013.01); *F05D 2260/403* (2013.01); *Y02E 10/72* (2013.01)

(56) References Cited

U.S. PATENT DOCUMENTS

| | | | | |
|---|---|---|---|---|
| 4,510,405 A | * | 4/1985 | Carroll | H02K 7/10 |
| | | | | 310/41 |
| 5,130,592 A | * | 7/1992 | Bitsch | H02K 7/125 |
| | | | | 310/209 |
| 7,459,815 B2 | * | 12/2008 | Han | H02K 7/125 |
| | | | | 310/114 |
| 9,419,504 B2 | * | 8/2016 | Finkle | H02K 16/025 |
| 10,190,250 B2 | * | 1/2019 | Jang | D06F 37/30 |

FOREIGN PATENT DOCUMENTS

| | | |
|---|---|---|
| DE | 571367 C | 3/1933 |
| DE | 852573 C | 10/1952 |
| DE | 1062340 | 11/1954 |
| EP | 2728140 | 5/2014 |
| GB | 2242575 | 10/1991 |

OTHER PUBLICATIONS

European Search Report dated Mar. 23, 2018, issued in EP Patent Application No. 17194982.

* cited by examiner

ELECTRICAL MACHINE

CROSS-REFERENCE TO RELATED APPLICATION

This application is based upon and claims the benefit of priority from British Patent Application Number 1618616.5 filed 4 Nov. 2016, the entire contents of which are incorporated by reference.

BACKGROUND

The present disclosure concerns an electrical machine with a mechanical disconnect. In particular it concerns a permanent magnet electrical machine with a mechanical disconnect.

BRIEF SUMMARY

According to a first aspect there is provided an electrical machine comprising: a two-part rotor having a rotational axis and formed of: a first rotor part which includes a conical section and which is mounted to a shaft of the machine; a second rotor part which has a bore including a complementary conical section, the second rotor part configured to displace axially between a first state, in which it is engaged with the first rotor part to form the rotor of the electrical machine, and a second state, in which it is axially disengaged from the first rotor part; and a clutch having an engaged state and a disengaged state; wherein when the clutch is in one of the engaged and disengaged states the second rotor part is in its first state and wherein switching the clutch to the other of its engaged and disengaged states axially displaces the second rotor part to its second state.

Advantageously the two-part rotor enables the electrical machine to be stopped without stopping the first rotor part from rotating. Advantageously the electrical machine is therefore suitable to be mounted to a shaft of a gas turbine engine or other shaft which cannot be stopped in normal operation. Advantageously the electrical machine can be stopped in the event of a fault or when it is not required because its operation is not tied to the operational period of the prime mover of the shaft.

When the clutch is in its engaged state the second rotor part may be in its first state. Switching the clutch to its disengaged state may axially displace the second rotor part to its second state. Advantageously the clutch is only energised when it is desired to engage the rotor of the electrical machine. Advantageously the rotor parts will disengage in the absence of clutch engagement so the arrangement will fail safely if the clutch cannot be energised.

Alternatively when the clutch is in its disengaged state the second rotor part may be in its first state. Switching the clutch to its engaged state may axially displace the second rotor part to its second state. Advantageously the clutch only needs to be energised to disengage the rotor parts and therefore stop the electrical machine. Advantageously in normal operation when it is desirable to have both the machine shaft and the electrical machine operating the clutch does not require energy.

The clutch may comprise an electromagnetic actuator. The electromagnetic actuator may include a DC coil. The electromagnetic actuator may further comprise one or more permanent magnets. Advantageously the clutch may be engaged by applying a current through the DC coil. Advantageously the current required may be small.

The clutch may comprise a non-rotating member and a rotating member. The rotating member may be coupled to the second rotor part. The rotating member may be a part of the second rotor part, for example an axial end of the second rotor part or a protrusion therefrom. The non-rotating member may comprise a coil. The coil may be a DC coil. The rotating member may comprise a ferromagnetic plate. The electrical machine may comprise a permanent magnet electrical machine.

The complementary conical sections may include positive engagement features. The positive engagement features may comprise splines. Advantageously positive engagement features may improve the engagement between the conical sections of the first and second rotor parts of the electrical machine. Alternatively the complementary conical sections may engage through frictional contact. The complementary conical sections may include surface features to increase the friction therebetween, for example surface roughening.

The first rotor part may comprise more than one conical section. The second rotor part may comprise more than one conical section. Advantageously a first rotor part with more than one conical section may be suitable to engage with and complement different second rotor parts having a single conical section. Advantageously this reduces manufacturing costs for producing different machines. Similarly a second rotor part with more than one conical section may be suitable to engage with and complement different first rotor parts having a single conical section. Advantageously this reduces manufacturing costs for producing different machines.

The first and second rotor parts may each comprise more than one complementary conical section. For example the first rotor part may have two conical sections and the second rotor part may have two complementary conical sections. The two conical sections on each rotor part may be contiguous or spaced apart by a non-conical section. There may be more than two complementary conical sections, any adjacent two of which may be contiguous or spaced apart. The first rotor part may have a different number of conical sections to the second rotor part. The first rotor part may have more conical sections than the second rotor part or the first rotor part may have fewer conical sections than the second rotor part.

The electrical machine may further comprise a bias member to bias the second rotor part into its second state. Advantageously the bias member provides a restoring or returning force which opposes the force from the clutch. Advantageously the bias member more reliably separates the second rotor part from the first rotor part and therefore disengages the electrical machine. Alternatively the electrical machine may further comprise a bias member to bias the second rotor part into its first state. Advantageously the bias member provides a restoring or returning force which opposes the force from the clutch. Advantageously the bias member helps to ensure that the rotor parts engage fully. The bias member may comprise one of a compliant member, a spring, a Belleville washer. The bias member may comprise more than one compliant member, multiple springs or multiple Belleville washers.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
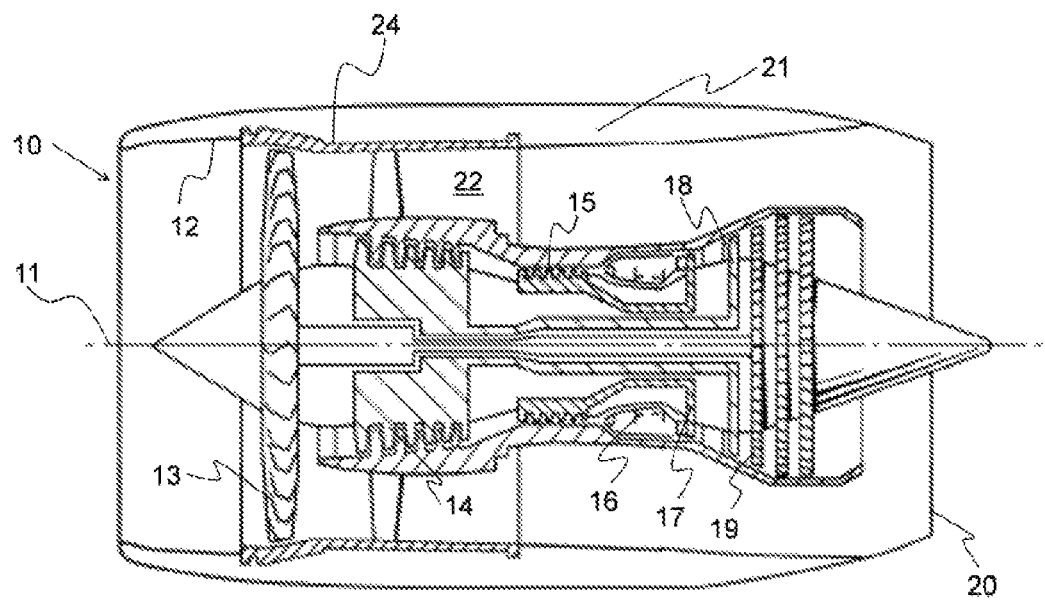
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
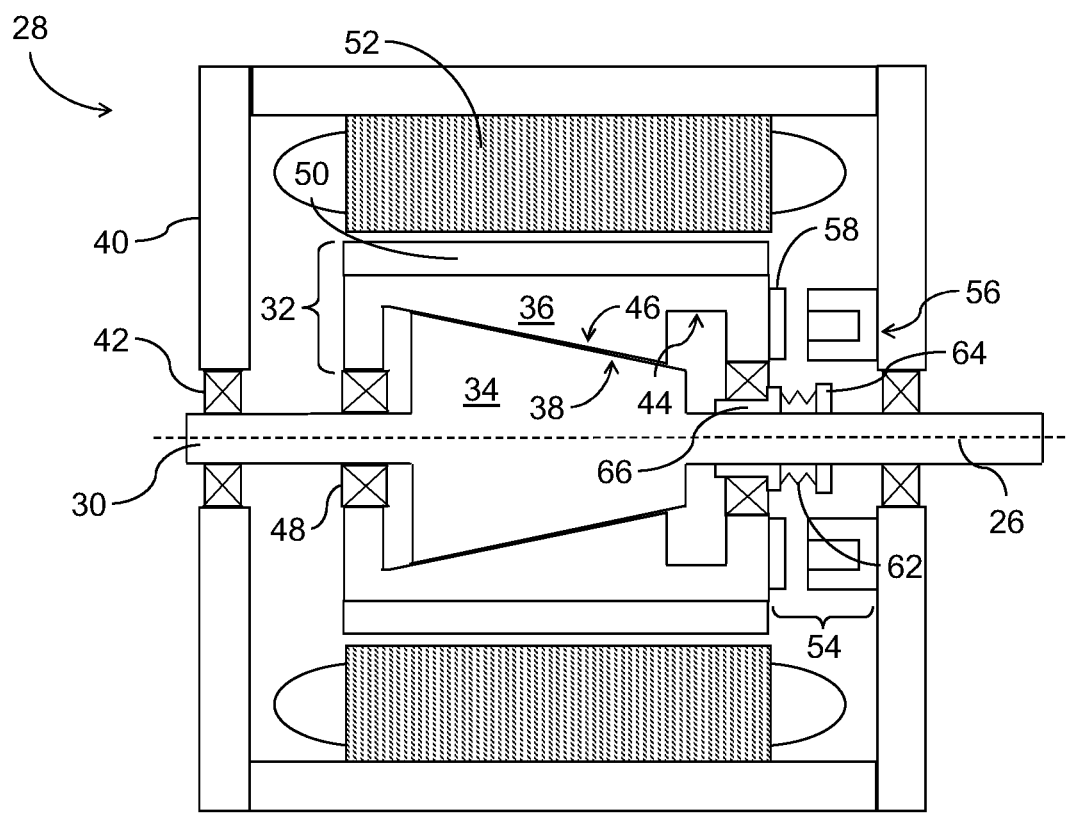
FIG. 2 is a schematic section of an electrical machine in a first state.

An electrical machine 28 is shown in FIG. 2. Such an electrical machine 28 may be used as a generator within a gas turbine engine 10 to provide electrical power. For example the electrical machine 28 may provide electrical power to pumps or valves on the engine 10. The electrical machine 28 may also be the main aircraft generator which provides power to the airframe. Electrical power generated by the electrical machine 28 may be delivered to an aircraft powered by the engine 10 for cabin systems such as in-seat entertainment.

The electrical machine 28 may be mounted to or be integral with an interconnecting shaft of the engine 10. Thus the electrical machine 28 may be mounted to or be integral with the low pressure shaft, between the low pressure turbine 19 and fan 13, with the intermediate pressure shaft, between the intermediate pressure turbine 18 and intermediate pressure compressor 14, or with the high pressure shaft, between the high pressure turbine 17 and high pressure compressor 15.

FIG. 2 shows a shaft 30 of the electrical machine 28 which may be one of the interconnecting shafts of the gas turbine engine 10. The electrical machine 28 includes a rotor 32 which is mounted to or integral with the shaft 30 and which rotates around a rotational axis 26 which may be coincident with the rotational axis 11. The rotor 32 is a two-part rotor. A first rotor part 34 is radially inside a second rotor part 36.

The first rotor part 34 includes a section 38 which is conical. The conical section 38 may extend the full axial length of the rotor 32 or may be shorter. In the latter case there is one or more additional section of the first rotor part 34 which is cylindrical or otherwise not conical. When the electrical machine 28 operates as a generator the first rotor part 34 is driven mechanically by the shaft 30. The shaft 30 may be mounted in a non-rotating housing 40 via bearings 42. The first rotor part 34 does not form part of the electromagnetic circuit of the electrical machine 28.

The second rotor part 36 is positioned radially outside the first rotor part 34 and has a bore 44. The bore 44 includes a section 46 which is conical and complementary to the conical section 38 of the first rotor part 34. The second rotor part 36 is supported on the shaft 30 by further bearings 48 so that it rotates freely on the shaft 30 and its rotation is driven by the first rotor part 34, as will be described below. The second rotor part 36 includes an annular array of permanent magnets 50 on its outer periphery.

Mounted to the housing 40 and positioned radially outside the rotor 32 is a stator 52 of the electrical machine 28. The stator 52 includes electrical coils. In operation of the electrical machine 28 as a generator the rotation of the rotor 32 and the consequent rotating magnetic field produced by the permanent magnets 50 induces a current in the coils of the stator 52.

To stop a permanent magnet electrical machine from generating, in response to a fault or otherwise, it is necessary to stop the rotor from rotating since the magnetism of the permanent magnets cannot be reversibly switched off. If the electrical machine is driven from an interconnecting shaft of a gas turbine engine 10 it is not possible to stop the shaft from rotating without shutting down the engine.

The disclosed electrical machine 28 overcomes this problem by virtue of the two-part rotor 32. In normal operation of the electrical machine 28 as a generator the conical section 46 of the second rotor part 36 is positioned to abut with the complementary conical section 38 of the first rotor part 34. The frictional contact between the conical surfaces engages the two parts 34, 36 of the rotor 32 together and causes them to rotate together as driven by rotation of the shaft 30.

Figure 3:
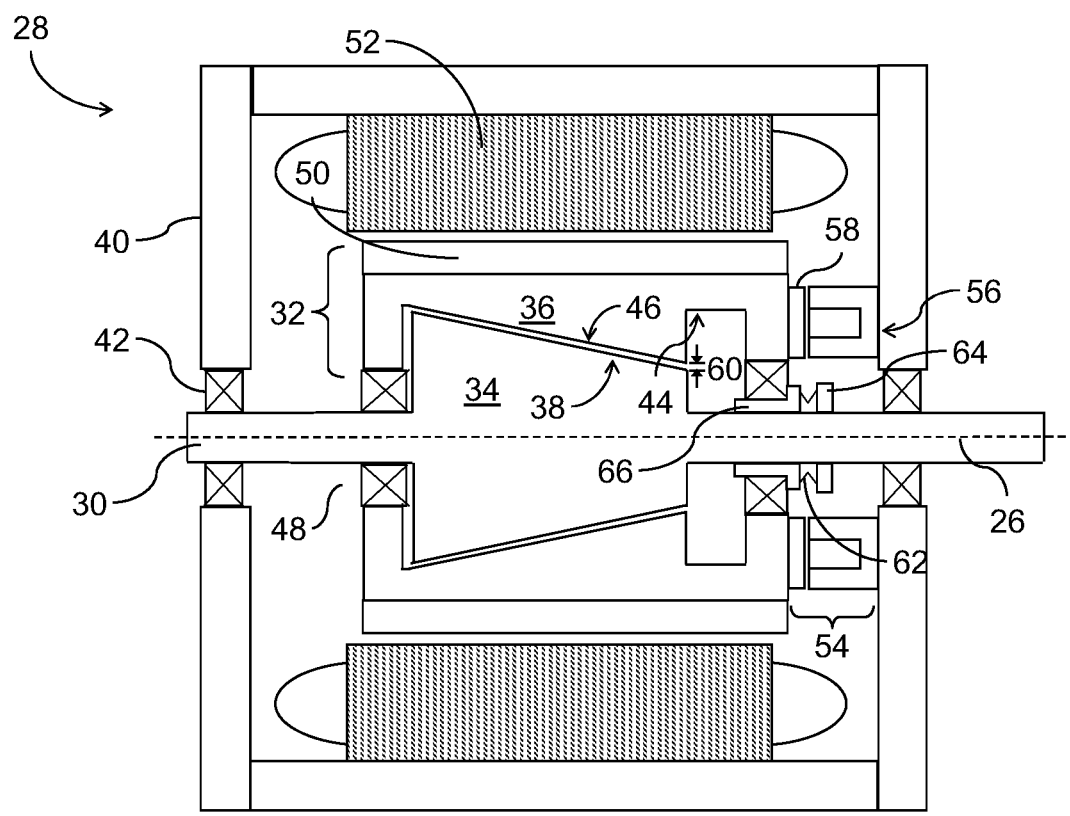
FIG. 3 shows the machine of FIG. 2 in a second state.

However, where a fault occurs the electrical machine 28 can be stopped from generating without having to stop the shaft 30 rotating. To do this the second rotor part 36 is displaced or translated axially relative to the first rotor part 34. The displaced position is shown in FIG. 3. By axially displacing the second rotor part 36 relative to the first rotor part 34 a radial gap 60 is opened between the complementary conical sections 38, 46 and thus the first and second rotor parts 34, 36 are disengaged. Thus the second rotor part 36 is no longer driven by the rotation of the shaft 30 and so slows to a halt. The rate at which it slows is dependent on the mass of the second rotor part 36, and therefore its inertia, and the inherent eddy currents which produce a braking torque.

Since the second rotor part 36 is no longer rotating the magnetic field generated by the permanent magnets 50 no longer rotates and so no current is induced in the coils of the stator 52. Therefore the electrical machine 28 stops generating electricity but the shaft 30, and the first rotor part 34, continue to rotate. Advantageously the shaft 30 may therefore be an interconnecting shaft of the engine 10 because it is not necessary to stop, break or interrupt the shaft 30 in order to stop the electrical machine 28 generating.

The electrical machine 28 includes a clutch 54. The clutch 54 has an engaged state and a disengaged state. One of the engaged and disengaged states of the clutch 54 corresponds to the second rotor part 36 being engaged with the first rotor part 34 whilst the other of the engaged and disengaged states of the clutch 54 corresponds to the second rotor part 36 being axially displaced from, and thus disengaged from, the first rotor part 34. In FIG. 2 and FIG. 3 the second rotor part 36 is engaged with the first rotor part 34 when the clutch 54 is in its disengaged state and vice versa. However, this relationship may be reversed with equal felicity.

The clutch 54 shown in FIG. 2 and FIG. 3 is an electromagnetic actuator. The clutch 54 has a non-rotating (stationary) part 56 and a rotating part 58. The non-rotating part 56 may include a DC coil. The rotating part 58 may be coupled to or be part of the second rotor part 36. The rotating part 58 may be a ferromagnetic plate, for example comprising iron, which may be annular.

In the disengaged, or de-energised, state of the clutch 54 the rotating and non-rotating parts 58, 56 are axially spaced apart so that the rotating part 58 can freely rotate relative to the non-rotating part 56. In the engaged state of the clutch 54, when it is energised, the rotating part 58 is drawn to the non-rotating part 56 and electromagnetically locked thereto. The rotating part 58 therefore no longer rotates when it is electromagnetically locked to the non-rotating part 56.

The clutch 54 acts to axially translate or displace the second rotor part 36 relative to the first rotor part 34. Consequently the rotating part 58 of the clutch 54 is mounted to, coupled to or integrally formed with the second rotor part 36, for example on an axial end face of the second rotor part 36. The rotating part 58 therefore rotates with the second rotor part 36. When the DC coil in the non-rotating part 56 of the clutch 54 is energised the rotating part 58 is drawn axially towards the non-rotating part 56 which consequently draws the second rotor part 36 axially towards the non-rotating part 56 of the clutch 54. This disengages the first and second rotor parts 34, 36 and opens the radial gap 60 there between. The second rotor part 36 and rotating part 58 of the clutch 54 are slowed to a halt by the combination of inertia and friction between the ferromagnetic plate 58 and the non-rotating part 56 of the clutch 54. The first rotor part 34 continues to rotate as driven by rotation of the shaft 30. Since the permanent magnets 50 no longer rotate no current is induced in the coils in the stator 52 and so the permanent magnet electrical machine 28 is safely but reversibly stopped from generating.

The electrical machine 28 may include a bias member 62, illustrated as a spring, which acts between a stop 64 and an inner bearing race 66. The stop 64 is mounted to or integral with the shaft 30 and rotates therewith. The inner bearing race 66 is mounted to or integral with the shaft 30 and is for the bearing 48 at the end of the second rotor part 36 close to the clutch 54. The inner bearing race 66 includes a radial lip. When the clutch 54 is engaged, so that the ferromagnetic plate 58 is drawn towards the non-rotating part 56, the spring 62 is compressed because the inner bearing race 66 slides on the shaft 30 due to the bearings 48 pushing axially against the radial lip.

When the clutch 54 is disengaged by virtue of the current to the DC coil in the non-rotating part 56 being stopped, the compression of the spring 62 is relaxed and it returns to its relaxed length. As a consequence, the inner bearing race 66 is pushed axially towards the first rotor part 34. Due to the radial lip the bearing 48 and the second rotor part 36 are also moved axially away from the clutch 54. The spring 62 therefore biases the second rotor part 36 into frictional contact with the first rotor part 34. The bias is overcome by energising the clutch 54. In the event of a failure or loss of power to the coil the rotor 32 defaults to its engaged state because the clutch 54 is not energised.

Figure 4:
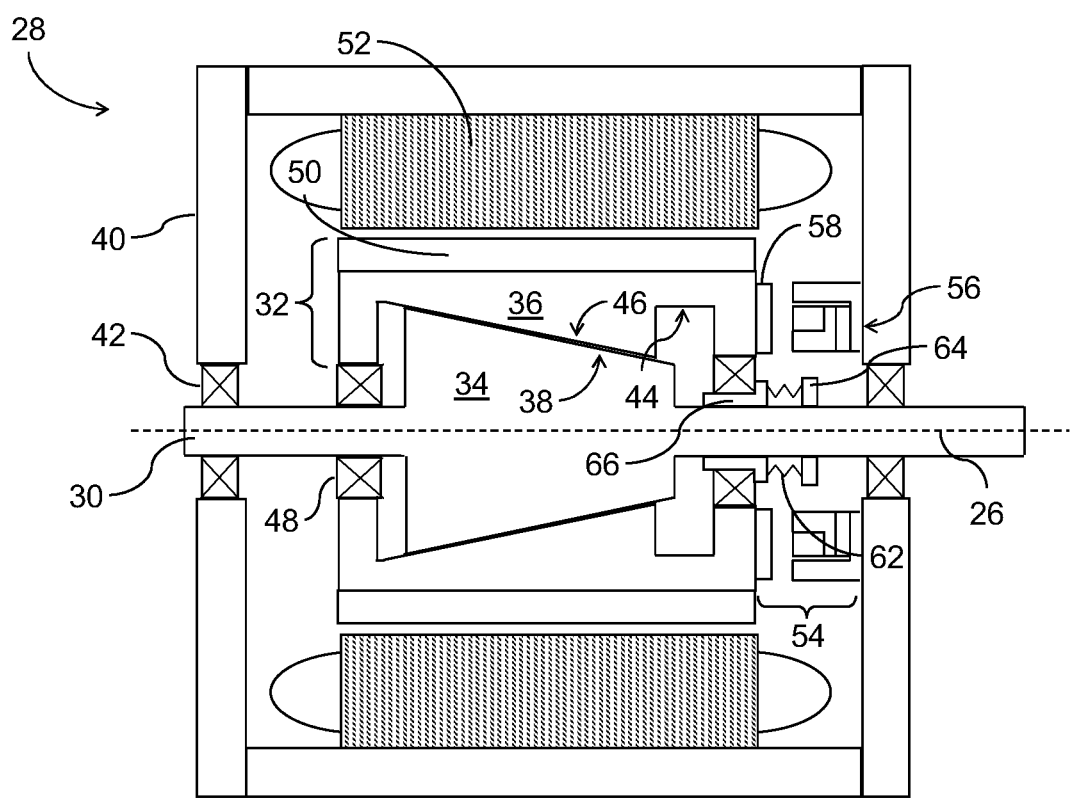
FIG. 4 is a schematic section of an electrical machine in a first state.
Figure 5:
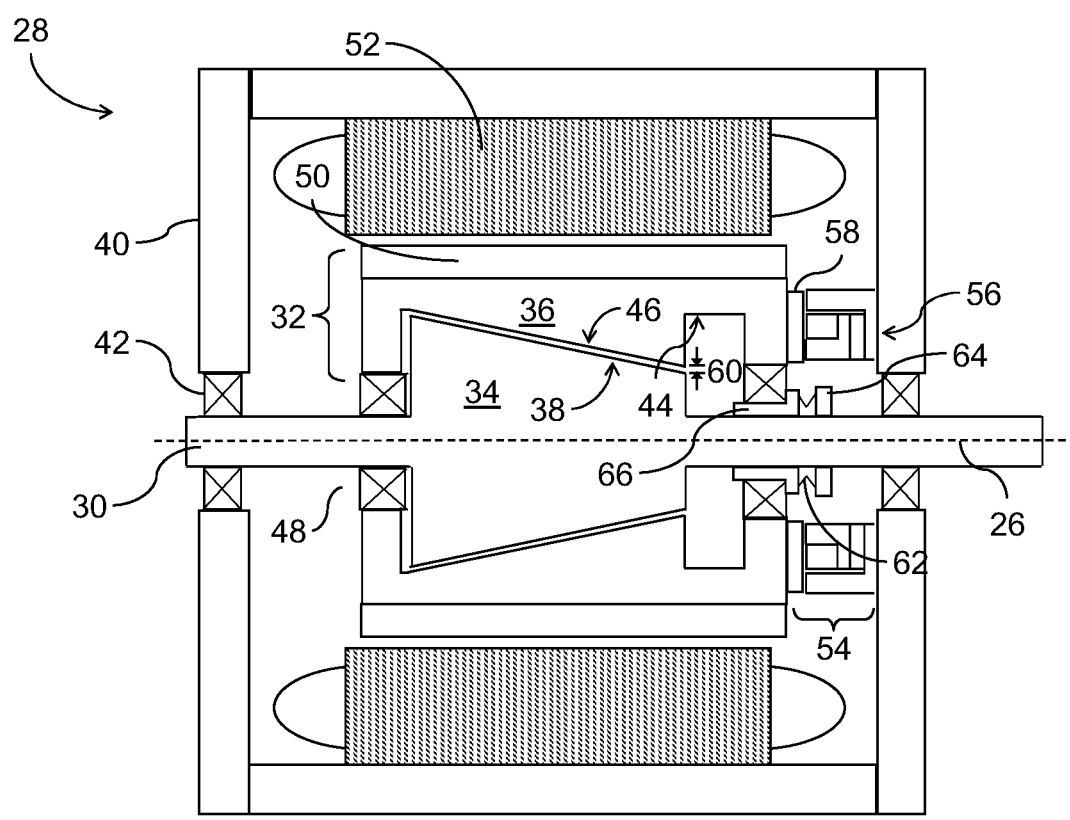
FIG. 5 shows the machine of FIG. 4 in a second state.

FIG. 4 is equivalent to FIG. 2 and FIG. 5 is equivalent to FIG. 3 except for the composition of the clutch 54 and its operation. As well as a DC coil the clutch 54 includes one or more permanent magnets in its non-rotating part 56. Thus the clutch 54 is a parallel polarised permanent magnet actuator, or hybrid excited actuator, which produces an attraction force in the absence of current in the coil. Thus the clutch 54 as illustrated in FIG. 4 and FIG. 5 acts in the opposite manner to that illustrated in FIG. 2 and FIG. 3 so that the rotor parts 34, 36 of the electrical machine 28 are disengaged when the clutch 54 is energised and are engaged when the clutch 54 is de-energised. In the event of a failure or loss of power to the coil the rotor 32 defaults to its disengaged state because the clutch 54 is energised.

Figure 6:
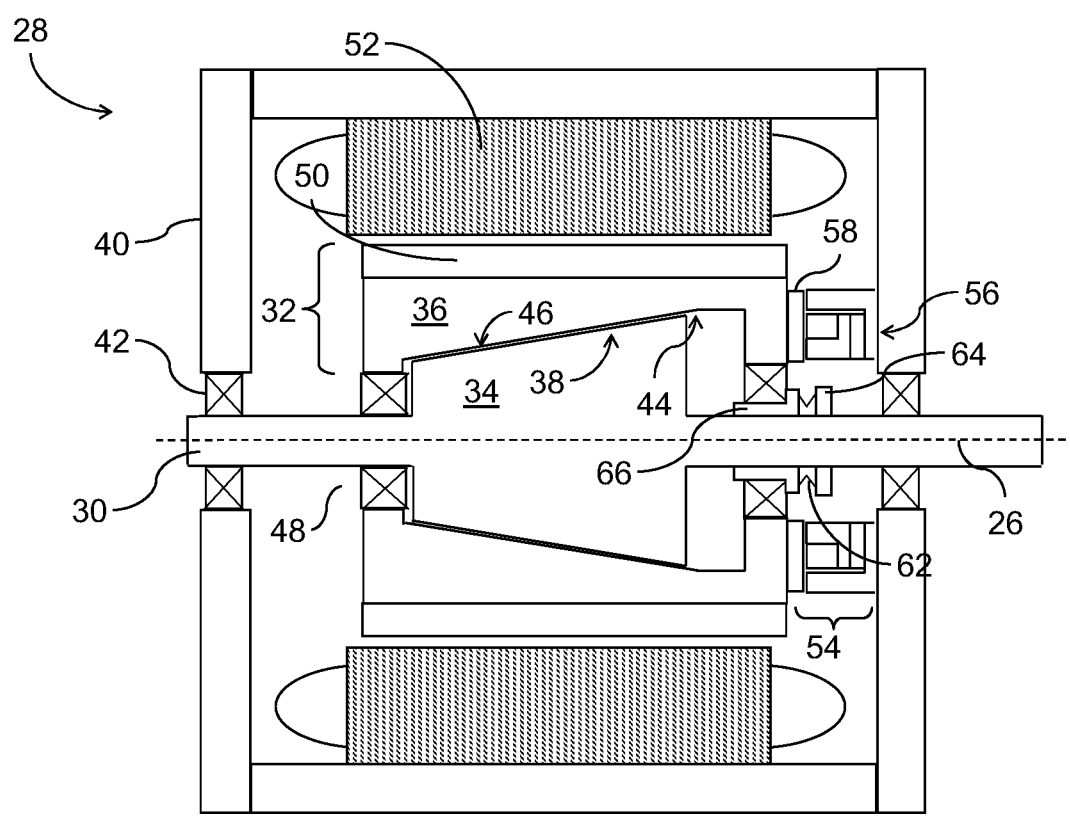
FIG. 6 is a schematic section of an electrical machine in a first state.
Figure 7:
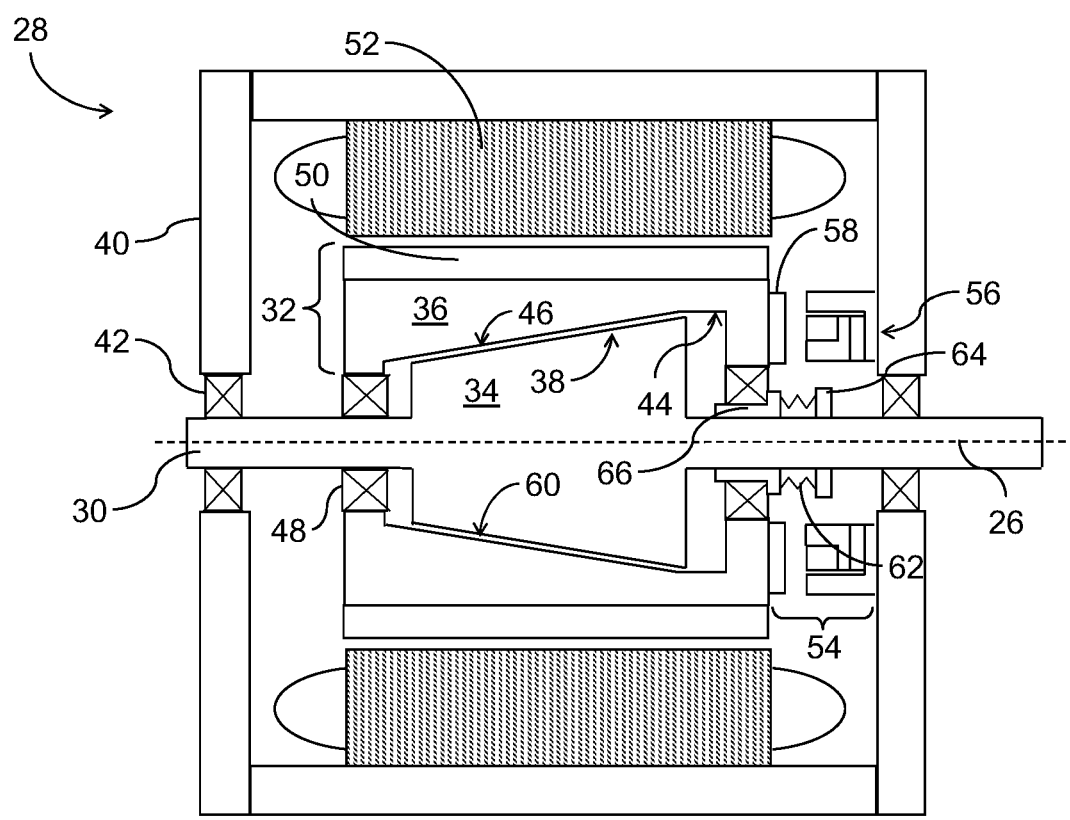
FIG. 7 shows the machine of FIG. 6 in a second state.

FIG. 6 and FIG. 7 are similar to FIG. 2 and FIG. 3 respectively. The rotor parts 34, 36 of the electrical machine 28 are engaged in FIG. 6 and are disengaged in FIG. 7. However, in FIG. 6 and FIG. 7 the conical sections 38, 46 are inclined in the opposite direction to those in FIG. 2 and FIG. 3. Thus when the clutch 54 is engaged the second rotor part 36 is in frictional contact with the first rotor part 34 and when the clutch 54 is disengaged the second rotor part 36 is axially spaced from the first rotor part 36, the radial gap 60 separates the parts 34, 36 and the rotor 32 is disengaged.

In the arrangement shown in FIG. 6 and FIG. 7 the bias member, spring 62, acts to bias the second rotor part 36 into its disengaged state where the radial gap 60 is opened between the first and second rotor parts 34, 36.

The alternative configuration of the clutch 54 is also applicable to the oppositely inclined rotor parts 34, 36 shown in FIG. 6 and FIG. 7. Thus the clutch 54 may have one or more permanent magnets in its non-rotating part 56 and therefore attract in the absence of current through the coil.

Figure 8:
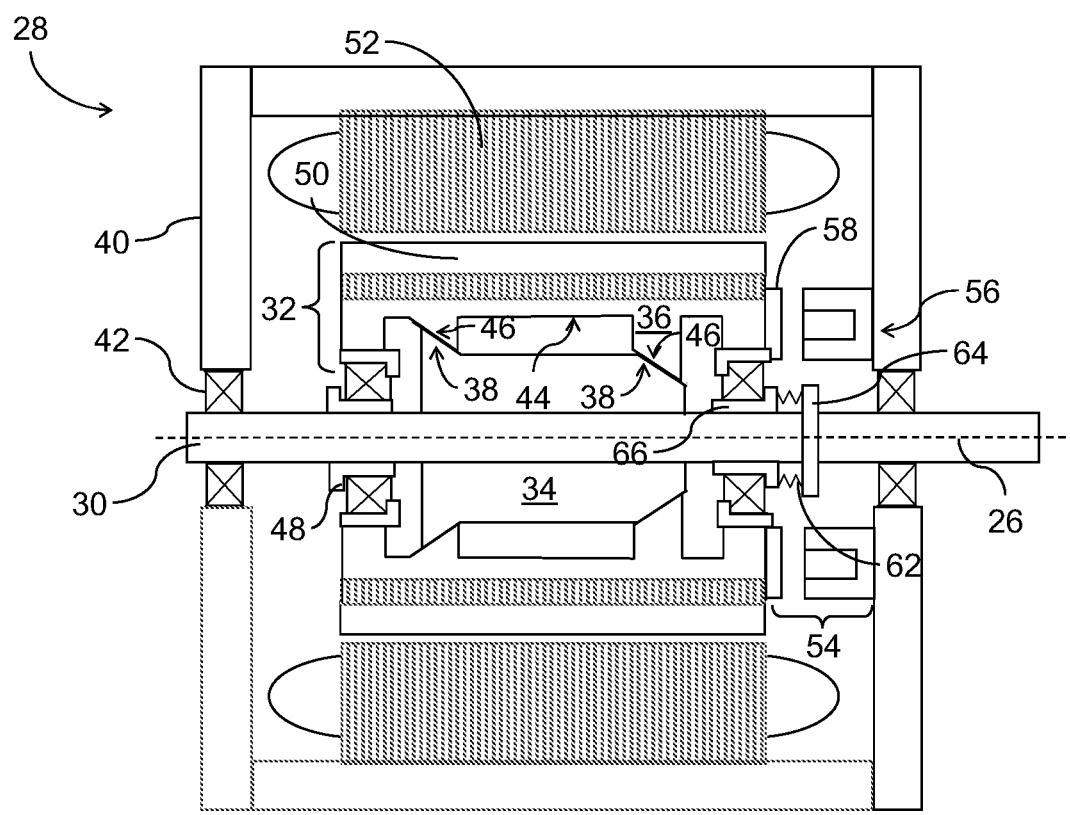
FIG. 8 a schematic section of another electrical machine in a first state.
Figure 9:
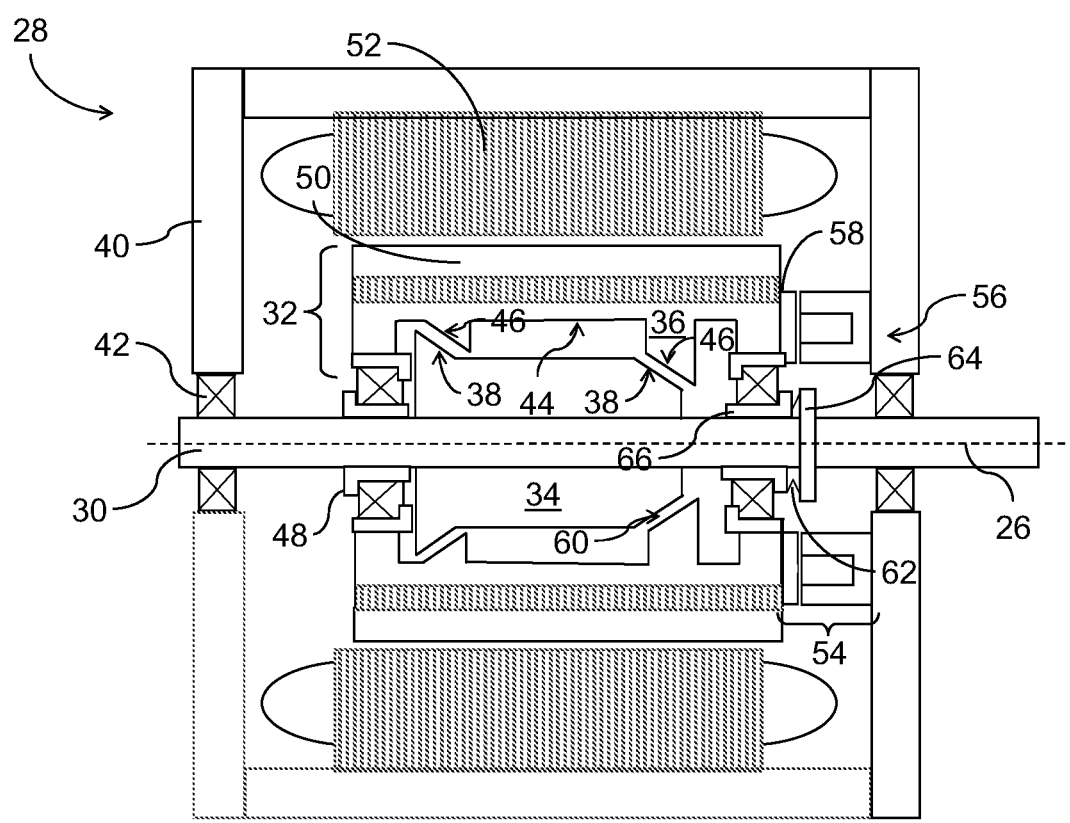
FIG. 9 shows the machine of FIG. 8 in a second state.

FIG. 8 and FIG. 9 show a further arrangement of the electrical machine 28 having the rotor 32 engaged and disengaged respectively. The first rotor part 34 has two conical sections 38 with a cylindrical section between them. The second rotor part 36 has two conical sections 46 to its bore 44 which correspond to the two conical sections 38 of the first rotor part 34. The section of bore 44 between the conical sections 46 may be cylindrical and is at a greater radius than the outer surface of the first rotor part 34. The diameter of the cylindrical section of the bore 44 may be slightly or greatly wider than the diameter of the first rotor part 34.

Axial translation of the second rotor part 36 due to engagement of the clutch 54 opens the radial gap 60 between the respective conical sections 38, 46, as shown in FIG. 9. The conical sections 38, 46 may alternatively be inclined in the opposite direction so that engaging the clutch 54 engages the complementary conical sections 38, 46 and so couples the second rotor part 34 to the first rotor part 36. Providing two, or more, complementary conical sections 38, 46 may improve the rotor dynamics in some applications of the electrical machine 28.

FIG. 8 and FIG. 9 also show iron laminations 68 in the second rotor part 34. The iron laminations are radially inside the permanent magnets 50.

Figure 10:
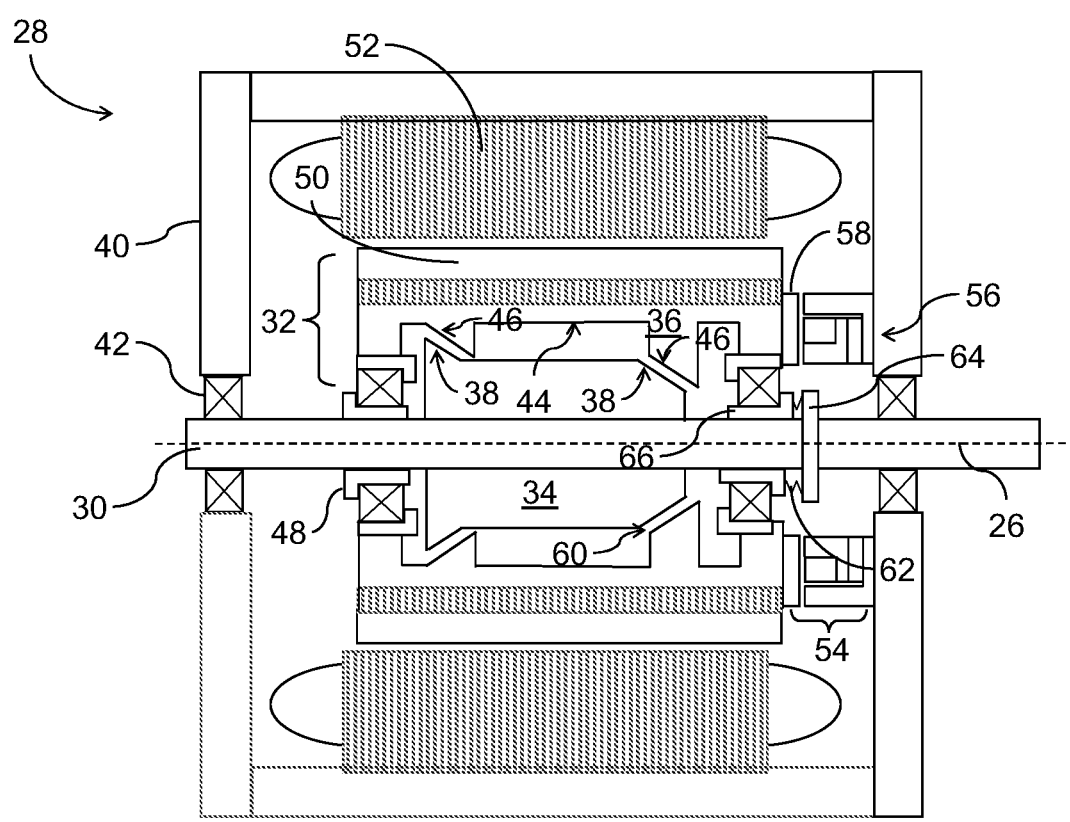
FIG. 10 also shows the machine of FIG. 8 in the second state with another actuator.

FIG. 10 is similar to FIG. 9 but includes the alternative version of the clutch 54 which has one or more permanent magnets in its non-rotating part 56 and therefore attracts in the absence of current through the coil.

Figure 11:
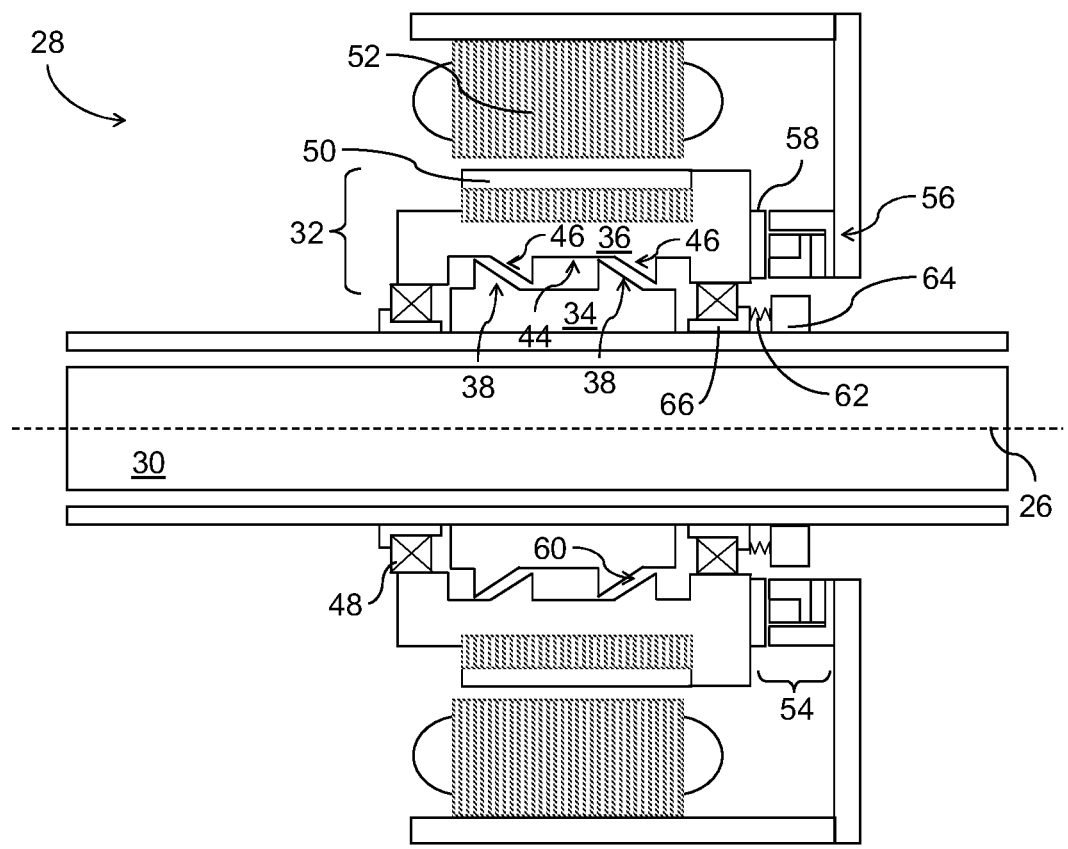
FIG. 11 is a schematic section of another electrical machine in a second state.

An alternative configuration of the first and second rotor parts 34, 36 is shown in FIG. 11. Again there are two complementary conical sections 38, 46 with cylindrical sections between the conical sections. The two conical sections 38 of the first rotor part 34 extend radially by the same distance so that all the cylindrical sections are the same diameter. The conical sections 46 of the bore 44 of the second rotor part 36 are correspondingly the same radial dimensions as each other the remainder of the bore 44 is cylindrical with a constant diameter. These shapes of first and second rotor parts 34, 36 can be used with any configuration of the clutch 54 and with or without iron laminations 68 in the active second rotor part 36.

The upper half of FIG. 11 shows the conical sections 38, 46 with the incline in one direction. The lower half of the figure shows the conical sections inclined in the opposite direction. As will be apparent to the reader, these are alternatives. In practical implementations of the electrical machine 28 the inclines would be in the same direction around the full outer periphery of the first rotor part 34 and inner periphery of the second rotor part 36.

Figure 12:
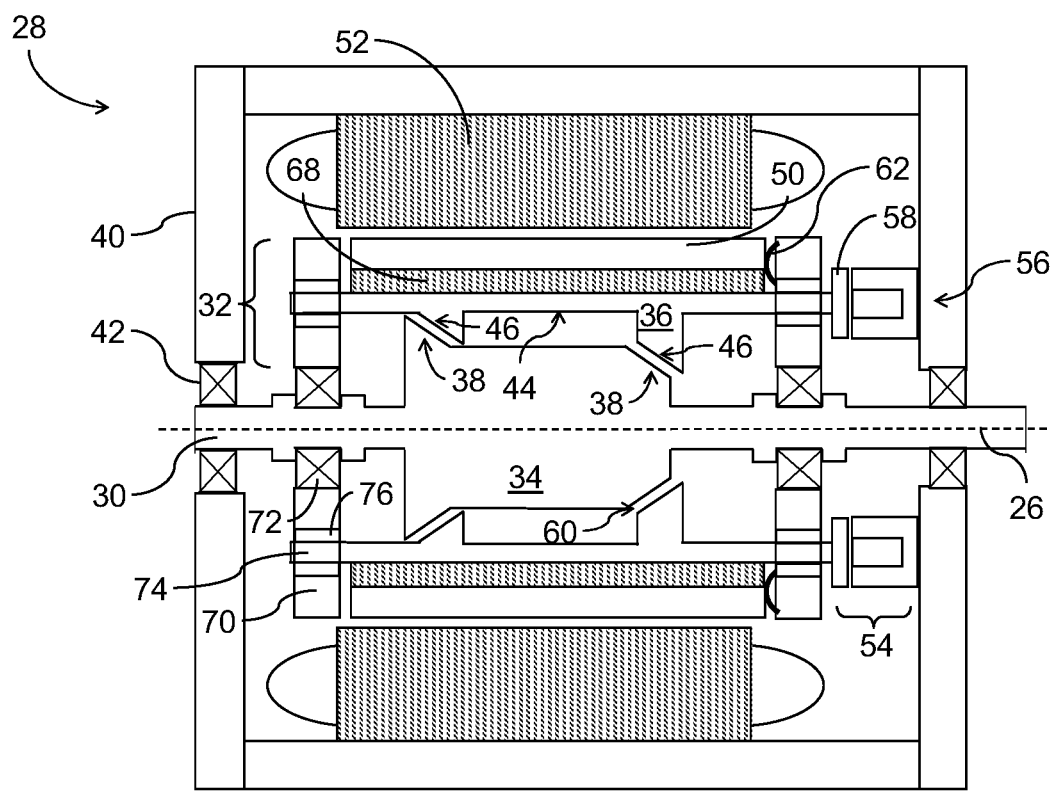
FIG. 12 is a schematic section of another electrical machine in a second state.

FIG. 12 is similar to the electrical machine 28 shown in FIG. 8 and FIG. 9. A pair of axially spaced discs 70 is provided mounted to the shaft 30 via bearings 72. The shaft 30 may include protrusions or other features to retain the discs 70 at the required axially positions. There is an axial space between the housing 40 and the disc 70, and between the disc 70 and the rotor 32 at each axial end. The second rotor part 36 includes a rod portion 74 at each end which extends into or through a bush 76 in each disc 70. The second rotor part 36, whether engaged with the first rotor part 34 or not, can therefore rotate independently of the discs 70. The rotating part 58 of the clutch 54 is mounted to the end of the rod portion 74 so that it is mounted on the opposite axial side of the disc 70 to the rotor 32.

When the clutch 54 includes only a DC coil in its non-rotating part 56 the bias member 62 may comprise a Belleville washer. The Belleville washer may be mounted on the disc 70 so that it is axially compressible by the second rotor part 36 when the clutch 54 is engaged. The washer pushes the second rotor part 36 axially, left as illustrated, in the absence of current in the coil of the clutch 54 so that the first and second rotor parts 34, 36 couple together.

The Belleville washer may also be used where the clutch 54 includes one or more permanent magnets and therefore is energised to connect (engage) instead of to disconnect (disengage) the rotor parts 34, 36. The spring 62 shown in earlier figures may be replaced by a Belleville washer. Similarly, the Belleville washer shown in FIG. 12 may be replaced by a spring.

Figure 13:
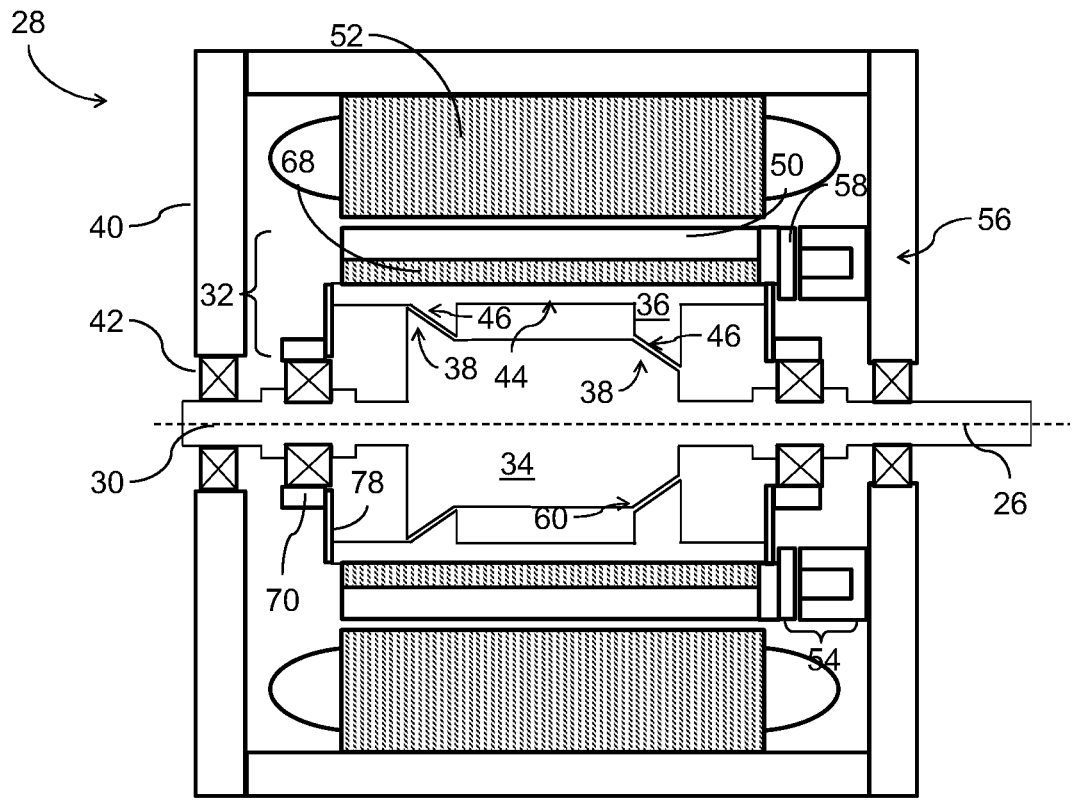
FIG. 13 is a schematic section of another electrical machine in a second state.

FIG. 13 shows a further configuration of the electrical machine 28 which is similar to FIG. 12. In this configuration the disc 70 is radially short and includes a compliant member 78. The disc 70 is shorter than the diameter of the bore 44 of the second rotor part 36. The compliant member 78 extends radially outwardly from the disc 70 and abuts axially with an end of the second rotor part 36. There may be one compliant member 78 mounted to each disc 70 so that there is one compliant member 78 at each axial end of the rotor 32.

The compliant member 78 at the end which is axially adjacent to the clutch 54 may be configured to bias the second rotor part 36 into contact with the first rotor part 34. Hence the bias is towards the rotor 32. Thus the axial force it exerts must be overcome by the engagement of the clutch 54 and provides a recovery force to engage the rotor parts 34, 36 when the clutch 54 is disengaged. Thus the compliant member 78 acts as the bias member 62 in place of a spring or Belleville washer.

The compliant member 78 at the other axial end, distal from the clutch 54, may be biased in the opposite direction. Hence it is also biased towards the rotor 32. Thus it is biased to push the second rotor part 36 axially to open the radial gap 60 between the first and second rotor parts 34, 36. When the clutch 54 is disengaged the bias of this compliant member 78 is balanced by the opposite force of the other compliant member 78. Advantageously this bias accelerates the radial separation of the rotor parts 34, 36 when the clutch 54 is engaged.

The compliant members 78 may be provided by any suitable components including disk springs, spiral disk springs and Belleville washers. The compliant members 78 may also be used where the clutch 54 includes one or more permanent magnets and therefore is energised to connect (engage) instead of to disconnect (disengage) the rotor parts 34, 36.

Figure 14:
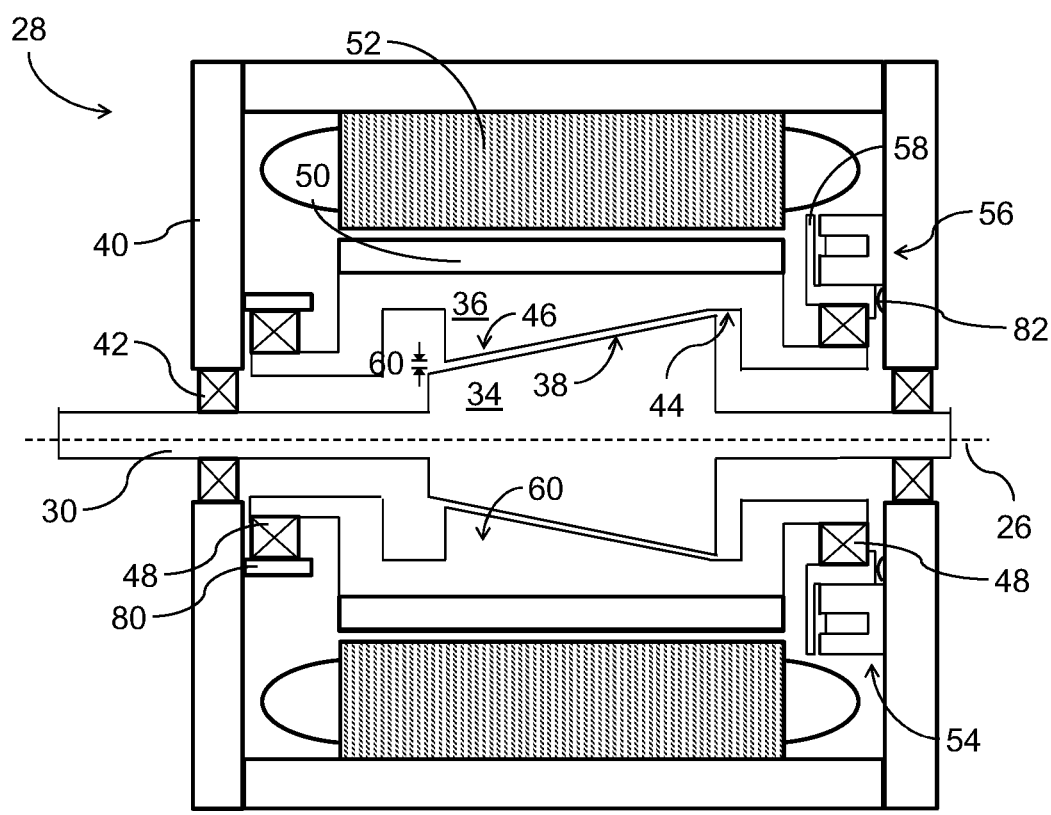
FIG. 14 is a schematic section of another electrical machine in a second state.

A further configuration of the electrical machine 28 is shown in FIG. 14. The configuration is similar to that shown in FIG. 2 and FIG. 3 except for the manner in which the second rotor part 36 is mounted. At the end of the rotor 32 which is distal to the clutch 54 there is a bearing 48. One of the races of the bearing 48 is mounted to the housing 40 via a static protrusion or otherwise. The other race is provided on or coupled to the second rotor part 36 so that the second rotor part 36 is able to rotate relative to the static housing 40. There is a further bearing 48 at the same end as the clutch 54. The bearing 48 acts between races, one of which is provided on or coupled to the second rotor part 36. The other race is coupled to, formed with or mounted to an extension of the rotating part 58 of the clutch 54. A Belleville washer 82 or other bias member may be provided between the rotating part 58, actuator, of the clutch 54 and the housing 40. The Belleville washer 82 provides a return force when the clutch 54 is de-energised and thereby assists the axial separation, disengagement, of the second rotor part 36 from the first rotor part 34.

The alternative configuration of the clutch 54 is also applicable to the electrical machine 28 as shown in FIG. 14.

Thus the clutch 54 may have one or more permanent magnets in its non-rotating part 56 and therefore attract in the absence of current through the coil.

Mounting the second rotor part 36 from the housing 40, via bearings 48, rather than from the shaft 30 can be applied to any of the configurations of the electrical machine 28 described herein. Thus it is applicable whether the conical surfaces 38, 46 are inclined towards or away from the clutch 54; whether there is one or more than one pair of complementary conical surfaces 38, 46; whether the clutch 54 is arranged to engage or disengage to bring the first and second rotor parts 34, 36 into engagement; and with any form of bias means to provide a return force on the rotor parts 34, 36 which is opposed to the force generated by the clutch 54 when energised.

The complementary conical surface 38 of the first rotor part 34 and conical surface 46 of the second rotor part 36 may engage by frictional contact. Alternatively they may include positive engagement features. The positive engagement features may be, for example, complementary splines or profiled teeth. The splines may include end sections which guide the splines on the second rotor part 36 into correct intermeshing relation with the splines on the first rotor part 34, for example a throat shape on one set of splines to draw the other set of splines into correct alignment. Advantageously splines or similar positive engagement features improve the engagement between the first and second rotor parts 34, 36. However, the provision of splines may require greater axial translation of the second rotor part 36 in order to disengage the first and second rotor parts 34, 36.

Advantageously the second rotor part 36 includes inherent eddy currents which apply a braking torque when it is translated out of contact with the first rotor part 34. The braking torque therefore slows the rotation of the second rotor part 36 more quickly to stationary. The level of eddy currents, and therefore braking torque, can be enhanced by selecting suitable materials for the second rotor part 36.

Optionally an anti-rotation feature may be provided on the second rotor part 36 in order to assist in retarding its rotational speed when disengaged from the first rotor part 34. For example saliency or a reluctance feature could be provided to give a small holding torque. However, such a feature must be designed so that it does not affect the performance of the electromagnetic actuator, clutch 54.

The angle of incline of the conical surfaces 38, 46 is defined between the surface and the rotational axis 26 of the electrical machine 28. Although any angle can be used a range between 8° and 20° inclusive has been found to be practical. Greater angles, that is a steeper conical surface 38, 46, reduce the mean diameter of the rotor 32 and therefore reduce the torque transmission capability. Conversely, shallower angles reduce the axial force required to translate the second rotor part 36 and therefore reduce the required size of the electromagnetic actuator, clutch 54. However, too shallow an angle may lead the rotor parts 34, 36 to bind together meaning they do not release when the axial force is removed. In some embodiments the tangent to the angle of incline can be set to be greater than or equal to the coefficient of friction between the rotor parts 34, 36.

Where there are two or more complementary conical surfaces 38, 46 the angles of incline may be the same. Advantageously the surfaces engage and disengage at the same point and the same rate. Alternatively the angle of incline of one of the pairs of complementary conical surfaces 38, 46 may be different to the angle of incline of the other pair, or one of the other pairs, of complementary conical surfaces 38, 46. Advantageously in this way the engagement surfaces can be fine-tuned for a given torque transmission requirement. Although two pairs of complementary conical surfaces 38, 46 could be inclined in the opposite direction to the rotational axis 26, for example at 8° and −8° respectively or at −8° and 10° respectively, this makes assembly of the electrical machine 28 challenging.

Where pairs of complementary conical surfaces 38, 46 are inclined at different angles the mean radius, maximum radius, and/or minimum radius may be the same as other pairs, similar to the electrical machine 28 in FIG. 11, or may be different, similar to FIG. 8.

The electrical machine 28 can also be operated as a motor. In this case a current is applied to the coils of the stator 52. The current affects the magnetic flux of the permanent magnets 50 thereby causing the magnetic field to rotate. Consequently the rotor 32 rotates and so mechanical power is extracted from the rotation of the shaft 30.

Although the electrical machine 28 has been described in the context of a gas turbine engine 10 to power an aircraft it is also applicable where the gas turbine engine 10 is used to power a marine vessel or land-based power plant. The electrical machine 28 is also suitable for use with a wind turbine or tidal turbine; with a diesel generator; and as a power pack for a rail vehicle.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An electrical machine comprising:
 a two-part rotor having a rotational axis and formed of:
   a first rotor part which includes a conical section and which is mounted to a shaft of the machine;
   a second rotor part positioned radially outside the first rotor part and which has a bore including a complementary conical section, the second rotor part configured to displace axially between a first state, in which the second rotor part is engaged with the first rotor part to form the rotor of the electrical machine, and a second state, in which the second rotor part is axially disengaged from the first rotor part, the second rotor part including an annular array of permanent magnets on an outer periphery;
 a stator including electrical coils and being positioned radially outside the two-part rotor; and
 a clutch having an engaged state and a disengaged state;
 wherein when the clutch is in one of the engaged and disengaged states the second rotor part is in the first state, wherein a switch of the clutch to the other of the engaged and disengaged states axially displaces the second rotor part to the second state, and wherein the clutch comprises an electromagnetic actuator.

2. An electrical machine as claimed in claim 1 wherein when the clutch is in the engaged state the second rotor part is in the first state and a switch of the clutch to the disengaged state axially displaces the second rotor part to the second state.

3. An electrical machine as claimed in claim 1 wherein when the clutch is in the disengaged state the second rotor part is in the first state and a switch of the clutch to the engaged state axially displaces the second rotor part to the second state.

4. An electrical machine as claimed in claim 1 wherein the electromagnetic actuator includes a DC coil.

5. An electrical machine as claimed in claim 4 wherein the electromagnetic actuator further comprises one or more permanent magnets.

6. An electrical machine as claimed in claim 1 wherein the clutch comprises a non-rotating member and a rotating member, the rotating member coupled to the second rotor part.

7. An electrical machine as claimed in claim 6 wherein the non-rotating member comprises a coil and the rotating member comprises a ferromagnetic plate.

8. An electrical machine as claimed in claim 1 wherein the electrical machine comprises a permanent magnet electrical machine.

9. An electrical machine as claimed in claim 1 wherein the conical section and the complementary conical section include positive engagement features.

10. An electrical machine as claimed in claim 9 wherein the positive engagement features comprise splines.

11. An electrical machine as claimed in claim 1 wherein the first and second rotor parts each comprise more than one complementary conical section.

12. An electrical machine as claimed in claim 1 further comprising a bias member to bias the second rotor part into the second state.

13. An electrical machine as claimed in claim 12 wherein the bias member is selected from the group consisting of a compliant member, a spring, and a Belleville washer.

14. An electrical machine as claimed in claim 1 further comprising a bias member to bias the second rotor part into the first state.

15. An electrical machine as claimed in claim 1, wherein the electrical machine is a generator and the electromagnetic actuator is configured to position the second rotor part in the second state, in which the second rotor part is axially disengaged from the first rotor part.

* * * * *